Patented Aug. 10, 1937

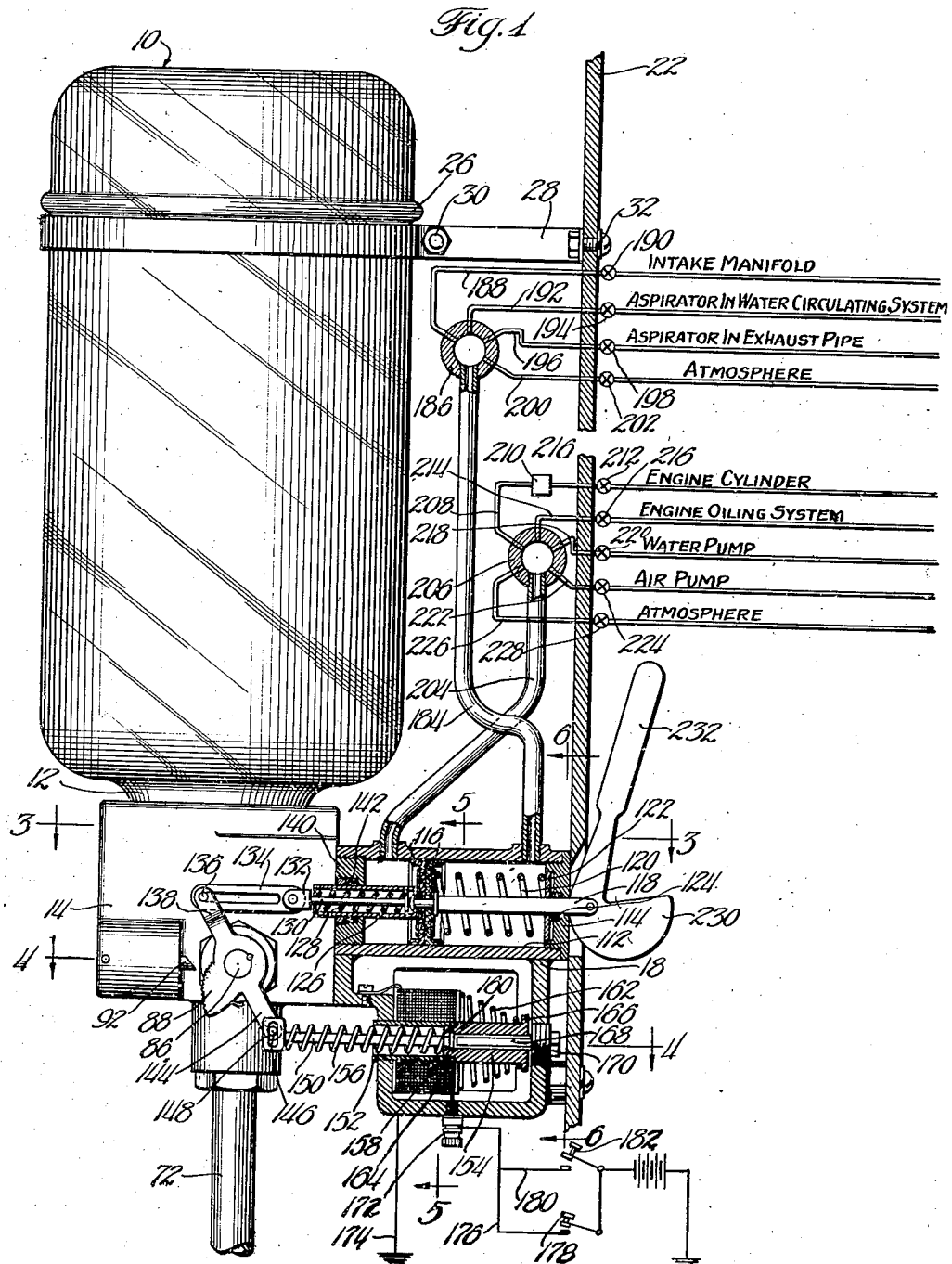

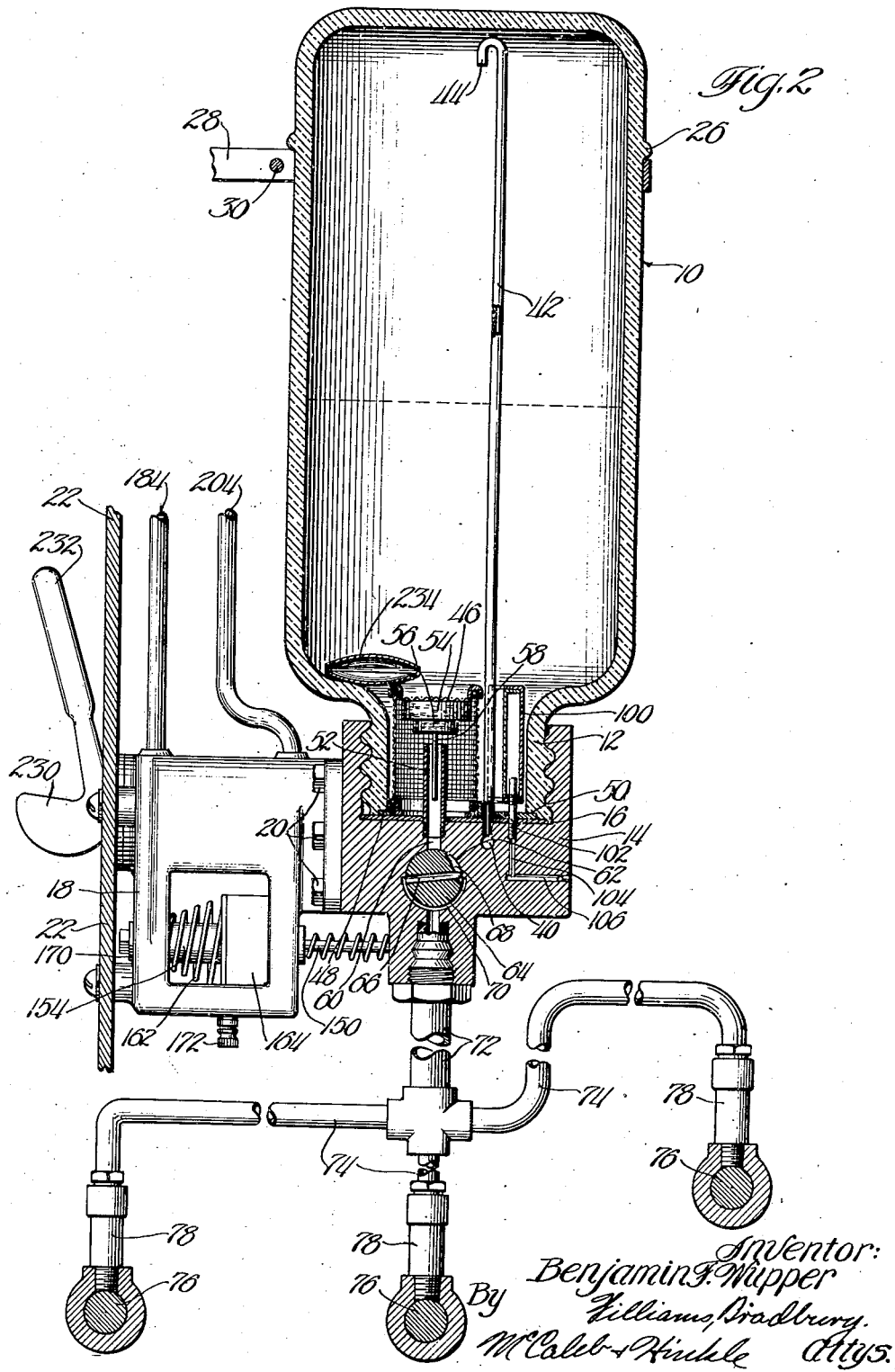

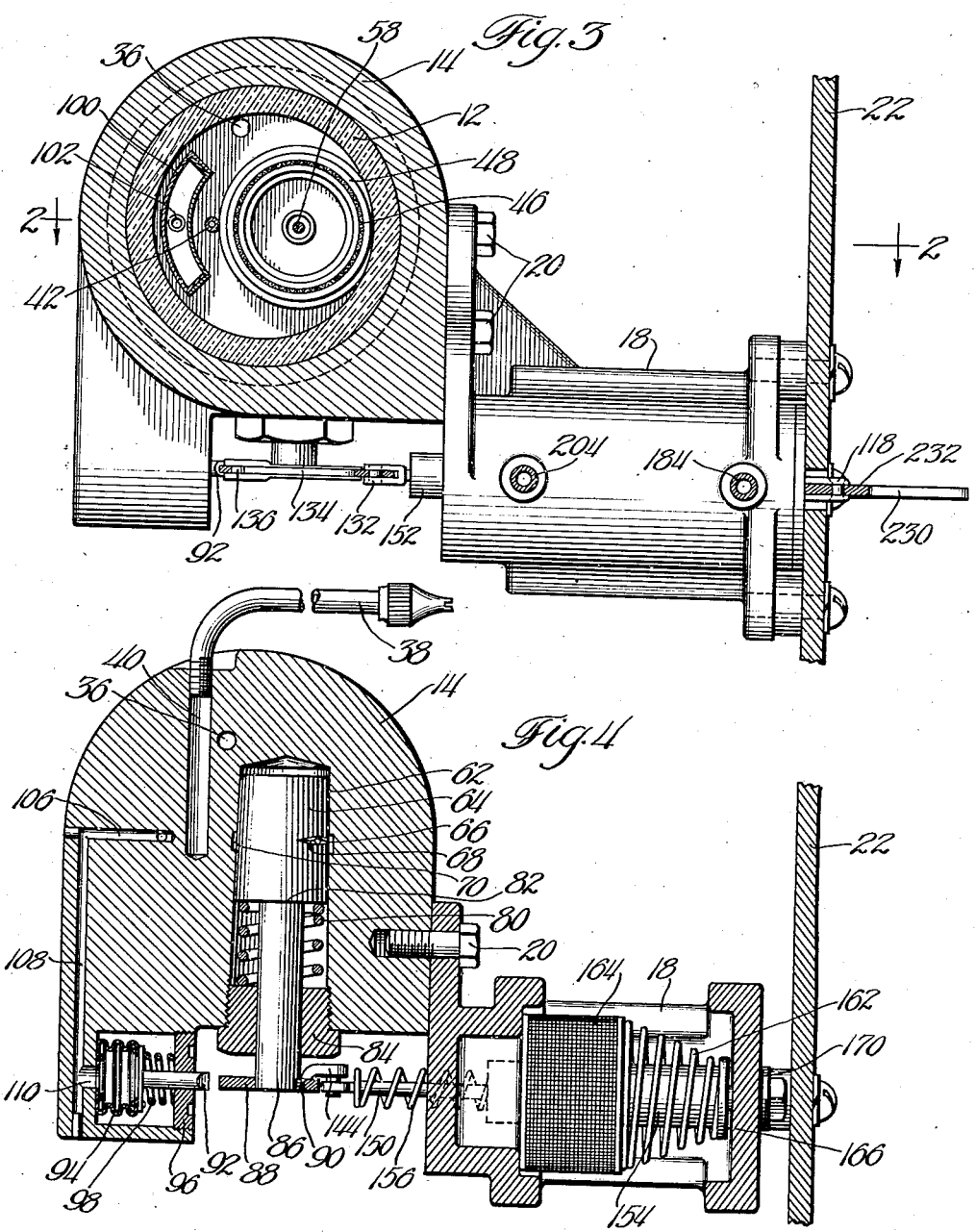

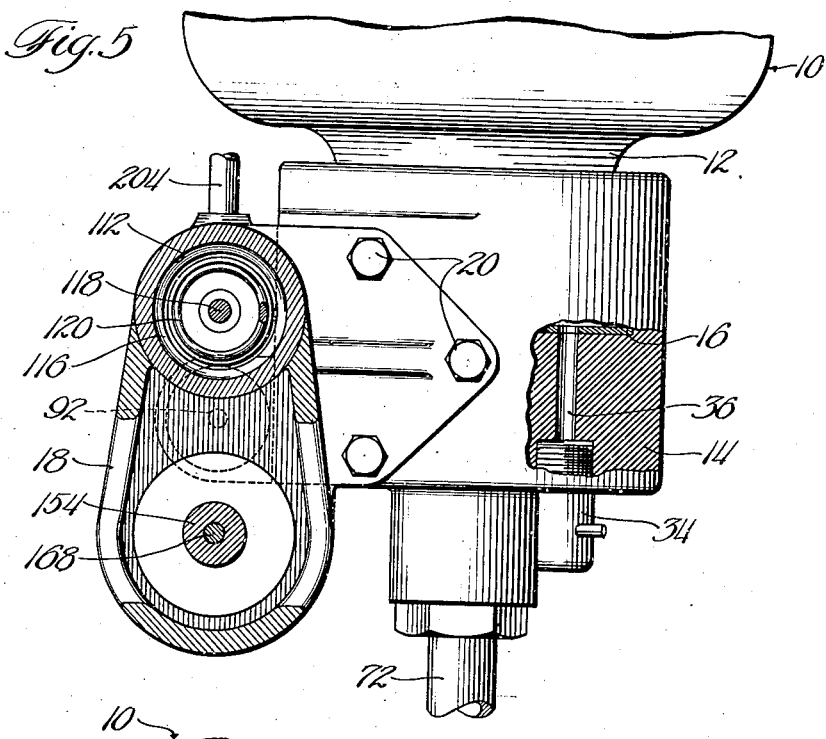
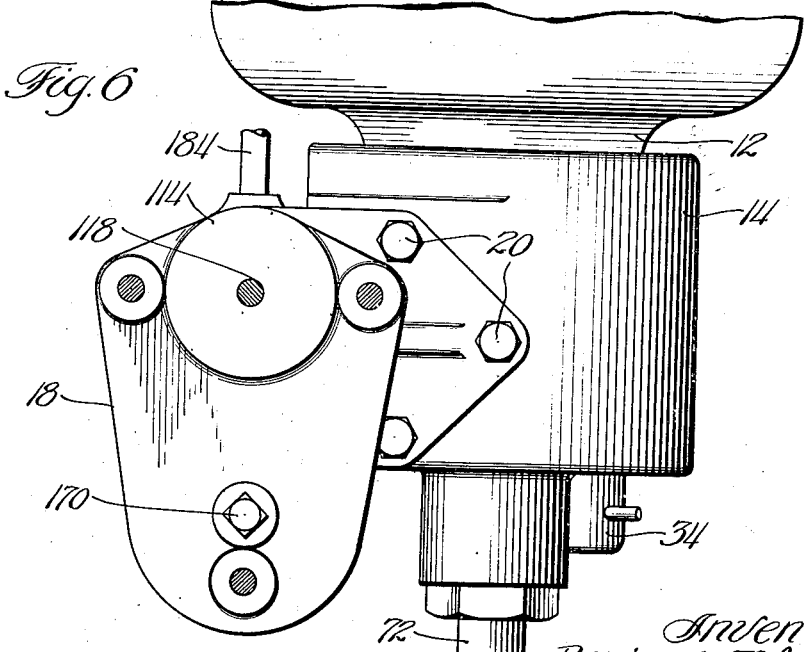

2,089,523

UNITED STATES PATENT OFFICE 2,089,523

LUBRICATING APPARATUS

Benjamin F. Wupper, Chicago, Ill., assignor, by mesne assignments, to Stewart-Warner Corporation, Chicago, Ill., a corporation of Virginia Application July 26, 1929, Serial No. 381,139

13 Claims. (Cl. 184—7)

My invention relates, generally, to lubricating apparatus and more particularly to centralized systems for lubricating a plurality of bearings on a single machine or group of machines. In carrying out my invention I contemplate the provision of a lubricant reservoir in which the lubricant is continuously maintained under pressure and in which manually or automatically operable means are provided to open a valve to connect the reservoir with the bearings to be lubricated. Various systems of this type have been proposed, but have been found to be impractical because of the variation in the quantity of lubricant forced to the bearings due to variations in temperature and hence viscosity of the lubricant, and due to variations in pressure in the reservoir. I have provided means for automatically compensating for such changes in the pressure upon the lubricant within the reservoir and also for changes in temperature, and have made other improvements which simplify the system and make its operation more reliable.

It is among the objects of my invention to provide a lubricating system in which the lubricant is forced continuously to the bearings requiring lubrication and wherein the quantity forced to the bearings is substantially uniform irrespective of the temperature.

Another object is to provide a lubricating system of the above mentioned type in which the lubricant reservoir is continuously maintained under pressure and in which an automatically operated valve permits flow of lubricant from the reservoir to the bearings to be lubricated at predetermined intervals depending upon any one of a number of functions of the machine in connection with which the system is used.

A further object of my invention is to provide various improved means for automatically controlling the period of lubrication.

A further object is to provide a system of the above mentioned type in which the lubricant reservoir is never open to the atmosphere, eliminating the possibility of dust and dirt entering the lubricant reservoir.

Other objects will appear from the following description, reference being had to the accompanying drawings in which—

Figure 1 is a side elevation of the reservoir and a vertical sectional view of the valve controlling means and diagrammatically illustrates various methods of controlling the operation of the valve;

Figure 2 is a central vertical section of the reservoir and control valve taken on the line 2—2 of Figure 3;

Figure 3 is a horizontal section taken on the line 3—3 of Figure 1;

Figure 4 is a horizontal section taken on the line 4—4 of Figure 1;

Figure 5 is a vertical section taken on the line 5—5 of Figure 1;

Figure 6 is a vertical section taken on the line 6—6 of Figure 1.

The lubricating system of my invention comprises, generally, a source of lubricant under pressure, a plurality of bearings to be lubricated, conduits connecting the bearings to the source, and a valve for adjustably controlling the flow of lubricant from the source through the conduit to the bearings. The degree which the valve may be opened and hence the rate of flow of lubricant from the source to the bearings is limited by a pressure and temperature responsive stop so that variations in the pressure and temperature of the source of lubricant will not affect the rate at which the lubricant is supplied to the bearings. I have also provided various optional means which may be used to open the valve. It is intended that only one, or possibly two, of these optional means be incorporated in one system. They are, however, illustrated and described as all being usable in connection with a single lubricant reservoir and conduit system.

As best shown in Figures 1 and 2, the lubricant reservoir comprises an inverted receptacle 10, preferably made of glass, and which has a threaded neck 12 formed at its lower end. The receptacle or reservoir 10 may thus be screwed into a body 14, a gasket 16 sealing the connection. The body 14 is secured to a cylinder casting 18 by cap screws 20, and the cylinder body may be secured to the dash 22 of an automotive vehicle or to any other suitable part of the machine to be lubricated. It may here be mentioned that while my invention is particularly adapted for use in the lubrication of automotive vehicles, it may also be used for the lubrication of any other kind of machinery and wherever reference is herein made to the parts of an automotive vehicle it should be understood that similar parts of other machines are included by inference.

The receptacle 10 has a bead 26 near its upper end, beneath which fits a supporting band 28 clamped around the receptacle by a bolt 30 and secured to the dash 22 by bolts 32.

Lubricant is supplied to the receptacle 10 by being forced from a suitable lubricant compressor coupled to a pin fitting 34 (Figure 5) which is screwed into the body 14. Lubricant passes from the pin fitting 34 through a duct 36 into the lower end of the receptacle. Assuming the receptacle to have been practically empty, lubricant will be supplied until it is approximately two-thirds to three-fourths full and the pressure within the receptacle will thus be three or four times atmospheric, assuming the air in the receptacle to have been at atmospheric pressure upon starting the filling operation. If it is desired to increase the pressure at which the lubricant is to be supplied, additional air under pressure may be supplied through the valve stem 38 which contains a valve such as customarily used on pneumatic tires and which is connected to a horizontal passageway 40. The passageway 40 communicates with a tube 42 which is threaded into the body 14 and projects upwardly to a point adjacent the top of the receptacle 10 and terminates in a hook portion 44 which prevents lubricant from passing out of the tube 42.

A wire mesh strainer 46, having a base flange 48 resting in a suitable recess 50 formed in the end of the neck 12, surrounds an outlet tube 52 which is threaded in the body 14. A float 54, having a sealing gasket 56 and a guide stem 58 projecting into the tube 52, is retained in position by the strainer and is adapted to close the end of the outlet tube 52 when the level of the lubricant in the receptacle falls below a predetermined minimum and thereby prevent air being forced from the receptacle into the conduit system.

The outlet tube 52 communicates with a port 60 which opens into a tapered horizontal bore 62 formed in the body 14 and is normally closed by a tapered valve plug 64. This plug has a diametric passageway 66, one end of which terminates in a circumferential slot 68 of gradually increasing width and depth. The other end of the passageway 66 is always in communication with a semi-circular duct 70 to which a discharge conduit 72 is connected. The conduit 72 has any number of suitable branches 74 which lead to the bearings 76 to be lubricated. Suitable resistance units 78 are preferably connected adjacent the bearings so as to apportion the lubricant supply among the various bearings in accordance with their respective requirements.

The valve plug 64 is firmly held in its complementary bore by a spring 80 which is compressed between a shoulder 82 formed on the valve plug, and a bushing 84 threaded in the end of the bore 62. The stem 86 of the valve is also guided in the bushing 84 and has a stepped plate 88 secured at its end, the plate being held against rotation relative to the stem by a set screw 90.

Clockwise rotation (Figure 1) of the stem 86 is limited by a stop finger 92 which is rigidly secured to one end of an annular metallic bellows or "sylphon" 94 and is guided in a ring 96 threaded in the body 14. The sylphon 94 is normally held compressed by a spring 98 but is adapted to be expanded upon increases in pressure or temperature. The expansion of the sylphon is effected by an imperforate flexible wall container 100 located within the lower end of the receptacle 10. This container is arcuate in cross section so as to conform to the space between the neck 12 and the strainer 46, and is secured to the body 14 by a short pipe nipple 102, the latter communicating with the sylphon through ducts 104, 106, 108 and 110. The container 100 preferably has a small quantity of liquid of low boiling point therein. Such liquids as ether, alcohol, chloroform, etc., or mixtures thereof, may be used. It will thus be seen that as the pressure within the reservoir 10 increases, the walls of the container 100 will be flexed inwardly and the increased pressure communicated to the sylphon 94 through the connecting ducts, thereby compressing the spring and forcing the stop finger 92 outwardly. Due to the configuration of the stepped plate 88, the angle through which the stem 86 may be rotated to open the valve is limited by this stop finger. Similarly, an increase in temperature of the lubricant in the receptacle 10 will result in partial evaporation of the liquid in the container 100 and cause an increase in pressure therein, which increase will, of course, be communicated to the sylphon 94 and result in forcing the stop finger 92 toward the plate 86 and limiting the degree of opening of the valve. By properly constructing the container 100 with walls of the desired flexibility; by using the proper liquids and proper quantity thereof within the container; by using a spring 98 of the resiliency required; by spacing the steps on the plate 88 proper distances, and by conforming the slot 68 to the desired shape, the degree of opening of the valve may be controlled so that the rate of flow of lubricant therethrough will be constant, irrespective of the variations of pressure within the reservoir and of the temperature of the system. The plate 88 and the finger 92 thus form parts of a differential stop means which limits the extent of opening of the valve in accordance with the pressure and temperature of the lubricant in the receptacle 10.

As previously intimated, I have provided optionally usable means for operating the valve 64. The casting 18 has a cylinder 112 formed therein, closed by a head 114. A piston 116 formed of two oppositely faced cup leathers and suitable reinforcing plates, is secured to a stem 118 and is resiliently held in its left-most position, as shown in Figure 1, by a spring 120, one end of which abuts against the piston and the other end of which is seated against a packing gland 122 which continuously holds a packing 124 within the head 114 compressed about the stem 118.

A cylindrical sleeve 126 is secured to the left-hand end of the stem 118 and forms an enclosure for a spring 128 which is held between an inwardly bent flange at the left-hand end of the sleeve 126 and a head formed at the end of a rod 130. The rod 130 has a yoke 132 which is pivotally joined to a longitudinally slotted link 134. A pin 136, rigidly secured at the end of an arm 138 formed integrally with the plate 88, projects into the slot in the link 134. The sleeve 126 is freely reciprocable in a head 140 and is sealed by a suitable packing 142.

The plate 88 also has a downwardly projecting arm 144 which, at its end, has a sidewardly projecting pin 146 which cooperates with a slot 148 formed in the end of a rod 150. The rod 150 is normally held in its left-most position relative to a non-magnetic sleeve 152 and a magnetic solenoid plunger 154 by a spring 156, the rod 150 having a head 158 which limits its leftward movement by engagement with a shoulder at the end of a bore 160 formed in the plunger 154. The plunger 154 is normally held to the right by a spiral coil spring 162 which is compressed between the side face of a coil 164 and a flange 166 formed at the right-hand end of the plunger 154. The plunger is guided by a pin 168 formed integrally with a plug 170, the pin projecting within the bore 160.

One end of the winding of the coil 164 is connected to the supporting casting, while the other end is connected to a binding post 172 which is insulated from the casting. The casting, is, of course, grounded through the conduit system, but an additional grounding wire 174 may be secured to the casting. The electromagnet 164 may be connected in the ignition circuit 176 so that whenever the ignition switch 178 is closed, the electromagnet will be energized or may be connected to the battery through a second circuit 180 which is adapted to be closed by a manually operable switch 182.

The right-hand end of the cylinder 112 is connected by a pipe 184 with a header 186. A conduit 188, having a valve 190, is connected to the intake manifold of the automotive vehicle upon which the system is installed. A similar conduit 192, having a control valve 194 therein, is connected to an aspirator in the water circulating system of the engine. A conduit 196, having a valve 198, is connected to an aspirator in the exhaust pipe of the engine. A conduit 200, having a valve 202, has its end open to the atmosphere.

A pipe 204 is connected to the left-hand end of the cylinder 112 and terminates in a header 206. A conduit 208, having a spring pressed check valve 210 and a manually operable valve 212, is connected to one of the engine cylinders. A similar conduit 214 connects the header 206 with the engine oiling system, a valve 216 being provided to shut off this conduit. A similar conduit 218, having a valve 220, is connected to the pressure side of the water circulating pump. Another pipe 222, having a valve 224, connects the header with the engine operated air pressure pump. Another conduit 226, having a valve 228, is adapted to connect the header with the atmosphere.

The end of the stem 118 has an eccentric cam 230 pivotally secured thereto, the pivotal connection offering sufficient friction so that manual force will be required to swing the cam on its pivot, a handle 232 being provided for manually operating the cam.

It will be understood that the reservoir and previously described valve mechanism will be located at a point on the vehicle where it will not be directly or greatly affected by changes in temperature due to the operation of the vehicle, but will be affected only by general changes in atmospheric temperature.

Whether or not the pressure within the receptacle is sufficiently high may be suitably indicated by a flexible walled, hollow disc 234 which is free to rise or descend in the reservoir. This disc operates on the principle of a Cartesian diver so that when the pressure rises above a predetermined minimum it will sink to the bottom of the receptacle and when the pressure in the reservoir drops below a predetermined minimum it will rise to the surface of the oil and thus serve as a visual indication that the pressure should be raised by supplying additional air under pressure by means of an air pump or source of compressed air connected to the stem 38.

In operation the reservoir 10 will be filled with lubricant in the manner previously described and if, after sufficient lubricant has been forced into the reservoir, the indicating disc 234 is still floating on the surface of the lubricant, additional air may be supplied through the stem 38. It is preferable, of course, that the pressure initially be considerably higher than the minimum required so that as the lubricant is forced from the reservoir the pressure will not drop below the minimum which is necessary effectively to force the lubricant to the bearings.

Assuming that it is desired to have the chassis lubricated continuously while the engine is running, the valve 190 may be opened and all of the other valves, with the exception of the valve 228, closed. Thus, when the engine is started, the suction in the intake manifold will be communicated to the right-hand end of the cylinder 112 and move the piston 116 to the right, thereby drawing the rod 130 to the right by force transmitted through the spring 128 and tending to rotate the plate 88 clockwise (Figure 1) against the tension of the spring 162, until such rotation is limited by the stop finger 92 which is automatically positioned, as previously described, to compensate for variations in pressure and temperature of the lubricant in the reservoir 10.

As soon as the engine stops, the spring 162 will force the plunger 154 to the right and thereby rotate the valve 64 counterclockwise and cut off the flow of lubricant to the bearings.

Similarly, by closing the valve 190 and opening the valve 194 the aspirator in the water circulating system will cause sufficient suction to open the valve 64 in the same manner as previously described.

By closing the valve 194 and opening the valve 198, the passage of gases by an aspirator in the exhaust pipe will create the suction for opening the valve 64.

The valve 64 may also be opened by pressure. Assuming the valves 190, 194, 198, 216, 220, 224 and 228 to be closed and the valves 202 and 212 open, the gas in the engine cylinders upon the compression stroke will be forced past the check valve 210 and through the pipe 204 to the left-hand end of the cylinder 112, thus forcing the piston 116 to the right and opening the valve in the same manner. Likewise, by closing the valve 212 and successively opening the valves 216, 220 and 224, the lubricant pressure in the engine oiling system, the hydraulic pressure in the water circulating system and the air pressure in the engine operated air pressure pump may be respectively used to supply fluid pressure to the left-hand end of the cylinder 112 and open the valve 64. In each instance the valve will, of course, be closed by the spring 162 whenever the pressure again drops to atmospheric. It may be stated here that the check valve 210 does not fit its seat tightly so that after the engine stops the pressure in the left-hand end of the cylinder 112 will gradually drop due to the leakage past the check valve.

If it is desired manually to control the opening of the valve 64, the handle 232 is swung clockwise (Figure 1), thus opening the valve through the mechanism previously described. It will be understood that the handle 232 will be frictionally held in any desired adjusted position and that it will be necessary manually to swing the handle 232 counterclockwise in order to permit the complete closure of the valve 64.

The valve may also be automatically operated whenever the ignition switch 178 is closed. The closing of this switch will complete a circuit through the electromagnet 164, whereupon the plunger 154 will be drawn to the left and through the spring 156 move the rod 150 to the left and open the valve 64 through an angle dependent upon the position of the stop finger 92. If desired, a separate circuit 180 may be used to energize the electromagnet 164 by manually closing the switch 182 in the circuit. Obviously, other means may be used to complete the circuit through the electromagnet 164, dependent upon the period during which it is desired to have the valve 64 open.

It will, of course, be understood that only one of the means for controlling the opening of the vave 64 is necessary in a single system and that I have shown numerous means for controlling the valve 64 in the system herein disclosed merely to illustrate optionally usable control means. In some instances it may, however, be desired to use more than one control means, such, for example, as using the manual control in connection with any one of the other controls.

While the mechanism herein shown and described is admirably adapted to fill the objects primarily stated, it is to understood that it is not intended to confine the invention to the forms of embodiment herein disclosed, for the invention is susceptible of embodiment in various forms all coming within the scope of the claims which follow.

I claim:

1. In a lubricating system of the class described, the combination of a closed reservoir, valved means to admit lubricant under pressure to said reservoir, valved means to admit air under pressure to said reservoir, a plurality of bearings to be lubricated, a conduit connecting said bearings to said reservoir, a valve controlling the flow of lubricant from said reservoir to said conduit, means to open said valve and means controlled by the pressure within said reservoir to limit the degree of opening of said valve.

2. In a lubricating system of the class described, the combination of a closed reservoir, means to admit lubricant under pressure to said reservoir, means to admit air under pressure to said reservoir, a plurality of bearings to be lubricated, a conduit connecting said bearings to said reservoir, a valve controlling flow of lubricant from said reservoir to said conduit, means to open said valve and temperature and pressure controlled means to limit the degree of opening of said valve.

3. In a lubricating system of the class described, the combination of a closed reservoir, means to admit lubricant under pressure to said reservoir, means to admit air under pressure to said reservoir, a plurality of bearings to be lubricated, a conduit connecting said bearings to said reservoir, a valve controlling the flow of lubricant from said reservoir to said conduit, means to open said valve and temperature controlled means to limit the degree of opening of said valve.

4. In a centralized machine lubricating system, the combination of a lubricant container, check-valved means to supply lubricant and air under pressure thereto, a plurality of bearings forming part of the machine to be lubricated, a conduit system connecting said bearings to said container, adjustable valve means for controlling the rate of flow of lubricant from said container to said conduit system in accordance with the pressure and temperature of the lubricant in said container, and means for opening and closing said valve.

5. In a centralized lubricating system of the class described, the combination of a lubricant container, means to supply lubricant thereto, a plurality of bearings to be lubricated, a conduit system connecting said bearings to said container, a valve for adjustably controlling the flow of lubricant from said container to said conduit system, suction operated means for opening said valve, and means conjointly responsive to the pressure and temperature of the lubricant in said container to limit the extent of opening of said valve.

6. In a centralized lubricating system of the class described, the combination of a lubricant container, means to supply lubricant thereto, a plurality of bearings to be lubricated, a conduit system connecting said bearings to said container, a valve for adjustably controlling the flow of lubricant from said container to said conduit system, pressure operated means for opening said valve, and means conjointly responsive to the pressure and temperature of the lubricant in said container to limit the extent of opening of said valve.

7. In a centralized lubricating system of the class described, the combination of a lubricant container for maintaining a supply of lubricant under pressure, a plurality of bearings to be lubricated, a conduit system connecting said bearings to said container, a valve for adjustably controlling the flow of lubricant from said container to said conduit system, magnetically operated means for opening said valve, adjustable stop means to limit the extent of opening of said valve by said magnetically operated means, said adjustable stop means being adjusted in accordance with the pressure in said lubricant container.

8. In a centralized lubricating system for the chassis of an automotive vehicle having an internal combustion engine, the combination of a source of lubricant under pressure, a plurality of bearings requiring lubrication, conduits connecting said bearings with said source, a valve intermediate said source and said conduits for controlling the flow of lubricant from said source to said bearings, electro-magnetic means energized upon closing the ignition circuit of said engine operable to open said valve, and adjustable stop means controlled by the temperature of the lubricant at said source to limit the extent of opening of said valve.

9. In a centralized lubricating system for the chassis of an automotive vehicle having an internal combustion engine, the combination of a source of lubricant under pressure, a plurality of bearings requiring lubrication, conduits connecting said bearings with said source, a valve intermediate said source and said conduits for controlling the flow of lubricant from said source to said bearings, suction operated means connected to the intake manifold of said engine to open said valve, and adjustable stop means conjointly controlled by the pressure and temperature of the lubricant at said source for limiting the extent of opening of said valve.

10. In a centralized lubricating system for the chassis of an automotive vehicle having an internal combustion engine, the combination of a source of lubricant under pressure, a plurality of bearings requiring lubrication, conduits connecting said bearings with said source, a positively operable valve intermediate said source and said conduits for controlling the flow of lubricant from said source to said bearings, means operated by lubricant pressure in the engine oiling system for opening said valve, and adjustable stop means controlled by the temperature of the lubricant at said source for limiting the extent of opening of said valve.

11. In a centralized lubricating system, the combination of a source of lubricant under pressure, a plurality of bearings to be lubricated, a conduit connecting said source with said bearings, a valve for controlling the flow of lubricant from said source to said conduit system, said valve having a passageway increasing in size with the degree of operation of the valve, means for automatically opening said valve, adjustable stop means controlled by the temperature of the lubricant at said source for limiting the degree of opening of said valve, and resilient means for closing said valve.

12. In a centralized lubricating system, the combination of a source of lubricant under pressure, a plurality of bearings to be lubricated, conduits connecting said source with said bearings, valve means for adjustably controlling the flow of lubricant from said source to said bearings, and stop means controlled by the temperature of lubricant at said source for limiting the extent to which said valve means may be opened.

13. In a centralized lubricating system, the combination of a source of lubricant under pressure, a plurality of bearings to be lubricated, conduits connecting said source with said bearings, means for adjustably controlling the flow of lubricant from said source to said bearings, and stop means controlled by the pressure of the lubricant at said source for limiting the extent to which said flow controlling means may be adjusted for maximum flow of lubricant.

BENJAMIN F. WUPPER.